3,519,595
STABILIZED POLYAMIDES
Karl Heinz Hermann and Hans Rudolph, Krefeld-Bockum, Germany, assignors to Farbenfabriken Bayer Aktiengesellschaft, Leverkusen, Germany, a corporation of Germany
No Drawing. Filed Mar. 28, 1967, Ser. No. 626,378
Claims priority, application Germany, Apr. 2, 1966, F 48,847
Int. Cl. C08g 51/56
U.S. Cl. 260—45.75                                5 Claims

ABSTRACT OF THE DISCLOSURE

Polyamide compositions are stabilized by the addition of 0.001 to 0.2 percent by weight of a copper salt and 0.001 to 5 percent by weight of zinc iodide, cadmium iodide, arsenic iodide, antimony iodide or bismuth iodide.

---

The present invention relates to stabilised polyamides using a combination of copper compounds and inorganic iodine compounds as stabilising agent.

Shaped articles such as filaments, bristles, foils etc. made from polyamides which have been obtained by polymerisation both of diamines and dicarboxylic acids and of aminocarboxylic acids or their lactams suffer a decrease in their relative viscosities and an impairment of their mechanical and elongation characteristics when subjected to the action of air or oxygen, especially at elevated temperatures. At the same time, the polyamide tends to become discoloured brown.

It is already known that polyamides may be protected against the damaging influences of air and oxygen at elevated temperatures by the addition of stabilisers. Examples of compounds which have already been proposed for use as stabilisers are as follows: Manganese salts of inorganic and organic acids, copper salts of inorganic and organic acids, derivatives of oxy acids of phosphorus, aromatic amines and phenols. Combinations of these groups of compounds with one another or with compounds which have no stabilising effect on their own, such as alkali metal halides or alkaline earth halides, iodine, aryl sulphonic acids, mercaptobenzimidazole etc. have been found to be preferable. The combination of copper salts with iodides of alkali metals, alkaline earths or substituted ammonium have been found to be particularly effective stabilisers. The iodides hitherto used, however, can be extracted by water and therefore their addition to polyamides such as polycaprolactam or copolyamides of caprolactam which have to be freed from monomer constituents by extraction with hot water cannot be carried out before this extraction. Addition after the extraction, on the other hand, necessitates an additional working step since the polyamide has to be melted again in order that it may be homogeneously mixed with the stabilisers. The extractability of iodides is also a disadvantage when the stabilised polyamide is to be used where it will come into contact with water or aqueous solutions.

It has now been found that this disadvantage can be avoided if the stabilisers used are a combination of a copper compound and iodides of metal of the Second subgroup or the Fifth main group of the Periodic System, e.g.

$ZnI_2$, $CdI_2$, $AsI_3$, $SbI_3$, $BiI_3$. The copper compounds used may be salts of inorganic acids, e.g. $Cu(II)Cl_2$, $Cu(I)Cl$, $Cu(II)Br_2$, $Cu(I)Br$, $Cu(I)I$, $Cu(I)CN$, $Cu(II)SO_4$, etc., salts of organic carboxylic acids such as Cu-acetate, Cu-stearate, Cu-benzoate etc., salts of monofunctional or polyfunctional phenols, or the complex compounds of such copper salts with ammonia, amines, amides, lactams, phosphites, phosphines, cyanides etc. The inorganic iodine compounds are preferably added in such quantities that the polyamide contains 0.001 to 1% by weight, and preferably 0.01 to 0.5% by weight, of iodine. The copper compounds are preferably used in such quantities that the polyamide contains 0.001 to 0.2% and preferably 0.001 to 0.02% by weight of copper.

The stabiliser combination of the inorganic iodine compound with the copper compound may be added to the polyamide-forming starting mixture before polymerisation, so that polymerisation may then be carried out in the usual manner, either continuously or in steps. On the other hand, the stabiliser combination may be mixed with the polyamide melt at a later stage, i.e. during or after polymerisation, if desired in the form of a concentrate in the polyamide; known mixing apparatuses such as extruders, kneaders, stirrers, etc. may be used for this operation. The stabiliser-containing polyamides may be freed from monomeric components by extraction with water after their preparation without the iodine content being thereby substantially diminished.

If desired, 0.01 to 0.2% by weight of a phosphorus compound may be added to the polyamide composition in addition to the inorganic iodine compounds and copper compounds, either before, during or after polymerisation, in order to achieve improved stability or diminished discoloration. Such phosphorus compounds may be primary, secondary or tertiary salts of phosphoric acid or phosphorus acid, the two acids themselves, their esters or amides, or phosphines.

Apart from stabilisers, the polyamides may also contain the usual additives such as pigments, dyes, light sensitisers, optical brighteners, fillers such as glass fibres or asbestos fibres, lubricants and mould parting agents, plasticisers, crystallisation promoters etc.

The polyamides stabilised by the process according to the invention against damage by oxidation at elevated temperatures, in particular, are especially suitable for use in the production of artificial silk for fishing nets, driving belts, conveyor belts etc., tire cords and shaped articles which are exposed to thermal stress under conditions whereby they have free access to air or oxygen.

The following examples illustrate more particularly the invention.

EXAMPLE 1 kg. of a colourless polycaprolactam prepared in the usual manner and having a relative viscosity of 3.12 (measured on a 1% by weight solution in m-cresol at 25° C. in a Ubbelohde-Viscosimeter) is melted by means of a conventional screw press and at the same time is mixed homogeneously with different stabilisers. The stabiliser-containing polycaprolactam is spun in the form of a bristle of about 3 mm. diameter, and is chopped up into granules and dried. The granulate is then stored in a drying cupboard at 150° C. with free access of air, and the relative viscosity is measured after 144, 500 and 1,000 hours.

In addition, samples of granulate are stored in water at 80 to 90° C. for 8 hours, and the iodine content of the polyamide after this time is determined analytically.

The experimental results are shown in Table 1. Experiments Nos. 7 to 9 are comparison tests.

3. The polyamide composition of claim 1 containing copper acetate and bismuth iodide.

4. The polyamide composition of claim 1 containing potassium copper cyanide and antimony iodide.

5. A polyamide composition according to claim 1 wherein the iodide is antimony iodide.

TABLE 1

| Serial No. | Copper compound | G. | Percent Cu in polyamide | Iodide | G. | Percent in polyamide | Relative viscosity | | | | Percent iodine in polyamide after storage in water | |
|---|---|---|---|---|---|---|---|---|---|---|---|---|
| | | | | | | | After mixing | After 144 hours | After 500 hours | After 1,000 hours | Found | Based on initial content |
| 1 | Cu(I)I | 0.36 | 0.012 | AsI$_3$ | 1.34 | 0.136 | 3.14 | 4.47 | 3.53 | 3.21 | 0.073 | 54 |
| 2 | K$_3$Cu(CN)$_4$ | 0.50 | 0.012 | SbI$_3$ | 1.48 | 0.112 | 3.16 | 4.29 | 3.69 | 3.31 | 0.068 | 16 |
| 3 | Cu(I)I.2-triphenylphosphine | 1.26 | 0.011 | ZnI$_2$ | 2.60 | 0.229 | 3.15 | 4.06 | 3.56 | 3.20 | 0.123 | 54 |
| 4 | do | 1.26 | 0.011 | CdI$_2$ | 1.62 | 0.134 | 3.17 | 3.91 | 3.30 | 3.08 | 0.068 | 51 |
| 5 | Cu(II)acetate.H$_2$O | 0.34 | 0.012 | BiI$_3$ | 1.40 | 0.090 | 3.15 | 4.02 | 3.46 | 3.11 | 0.054 | 60 |
| 6 | do | 0.34 | 0.012 | KI | 1.60 | 0.132 | 3.13 | 4.04 | 3.46 | 3.28 | <0.005 | <4 |
| 7 | K$_3$Cu(CN)$_4$ | 0.50 | 0.012 | NH$_4$I | 1.39 | 0.122 | 3.18 | 3.95 | 3.57 | 3.34 | <0.005 | <4 |
| 8 | K$_3$Cu(CN)$_4$ | 0.50 | 0.012 | CaI$_2$ | 1.41 | 0.122 | 3.12 | 3.97 | 3.55 | 3.32 | <0.005 | <4 |
| 9 | K$_3$Cu(CN)$_4$ | 0.50 | 0.012 | | | | 3.12 | 3.12 | 2.78 | 2.58 | | |

What we claim is:

1. A stabilized polyamide composition containing 0.001 to 0.2 percent by weight of a copper compound selected from cupric chloride, cuprous chloride, cupric bromide, cuprous bromide, cuprous iodide, cuprous cyanide, cuprous sulphate, cuprous acetate, cuprous stearate, cuprous benzoate and potassium copper cyanide, and 0.001 to 5 percent by weight of zinc iodide, cadmium iodide, arsenic iodide, antimony iodide and bismuth iodide, said proportions being based on the total weight of the polyamide composition.

2. The polyamide composition of claim 1 containing cuprous iodide and arsenic iodide.

References Cited

UNITED STATES PATENTS 2,705,227   3/1955   Stamatoff _____ 260—45.7

FOREIGN PATENTS 5,350   9/1954   Germany.
906,893   6/1945   France.

DONALD E. CZAJA, Primary Examiner

V. P. HOKE, Assistant Examiner

U.S. Cl. X.R.

260—45.7, 45.9